US006201362B1

(12) United States Patent
DeMichelis

(10) Patent No.: US 6,201,362 B1
(45) Date of Patent: Mar. 13, 2001

(54) ELECTROMAGNETIC HAMMER WITH MOBILE FERROMAGNETIC WEIGHT

(75) Inventor: Jacques DeMichelis, Bourgneuf-en-Retz (FR)

(73) Assignee: Enterprise de Travaux Publics et Prives Georges Durmeyer, Mittersheim (FR)

( * ) Notice: Subject to any disclaimer, the term of this patent is extended or adjusted under 35 U.S.C. 154(b) by 0 days.

(21) Appl. No.: 09/462,074

(22) PCT Filed: Jun. 25, 1998

(86) PCT No.: PCT/FR98/01351

§ 371 Date: Jan. 6, 2000

§ 102(e) Date: Jan. 6, 2000

(87) PCT Pub. No.: WO99/02787

PCT Pub. Date: Jan. 21, 1999

(30) Foreign Application Priority Data

Jul. 8, 1997 (FR) .................................................. 97 08654

(51) Int. Cl.[7] ........................... B25D 13/00; H02K 33/00

(52) U.S. Cl. ............................... 318/126; 310/50; 173/91

(58) Field of Search ........................ 173/91, 117; 310/14, 310/16, 17, 23, 29, 30, 32, 34, 35, 36, 50; 318/114, 125, 126, 127, 128, 130

(56) References Cited

U.S. PATENT DOCUMENTS 4,215,297 7/1980 Jacquemet ............................ 318/130
4,468,594 8/1984 Jacquemet ............................ 318/130
4,799,557 1/1989 Jacquemet .............................. 173/91

FOREIGN PATENT DOCUMENTS 2 581 100 10/1986 (FR) .

OTHER PUBLICATIONS

Patent Abstracts of Japan, vol. 006, No. 036 (M–115) Mar. 5, 1982 & Japan 56 153018 A (Hokuriku Concrete Kogyo KK) Nov. 26, 1981.

*Primary Examiner*—Nestor Ramirez
*Assistant Examiner*—Judson H. Jones
(74) *Attorney, Agent, or Firm*—Nixon Peabody LLP; Staurt J. Friedman

(57) ABSTRACT

An electromagnetic hammer having a ferromagnetic moving mass, the hammer comprising both a tube (1) designed to rest via an anvil on an element to be hammered (50), carrying a peripheral coil (2), and slidably receiving the mass (14) inside itself, and electrical power supply means connected to the coil (2) to excite it in such a manner as to generate an electromagnetic field for raising the mass, the mass striking the anvil under the action of its own weight when the coil is no longer excited, the coil (2) being made by being wound around the tube (1), and the tube being made of a non-magnetic material and having means (3, 4, 5, 6) for taking up axial forces and for transmitting said forces to the anvil (13) while the mass (14) is being raised. The power supply means comprise an flywheel associated with a rotary motor and with an alternator.

14 Claims, 5 Drawing Sheets

FIG_4
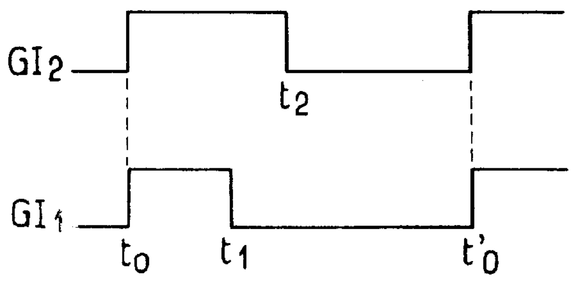
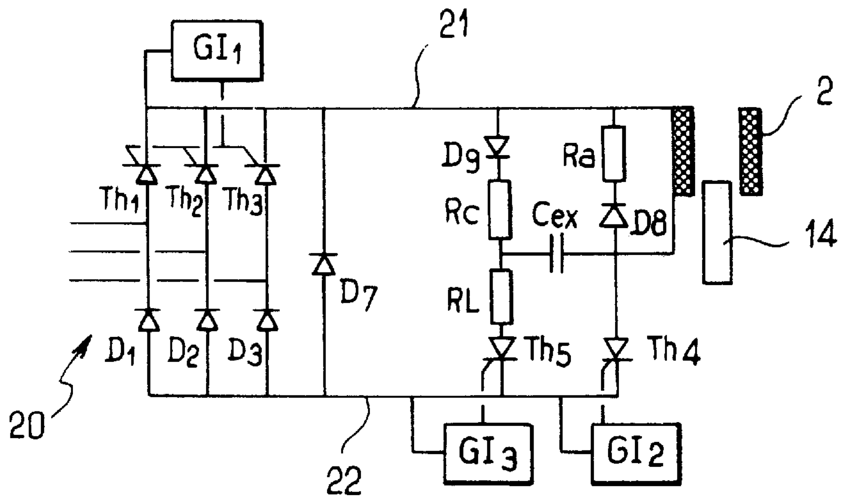
FIG_5
FIG_6
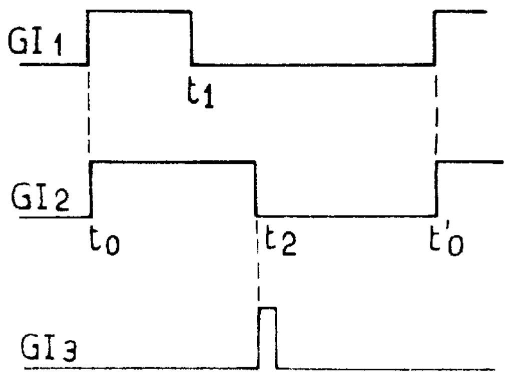

ELECTROMAGNETIC HAMMER WITH MOBILE FERROMAGNETIC WEIGHT

FIELD OF THE INVENTION

The invention relates to an electromagnetic hammer having a ferromagnetic moving mass. Such hammers are used, for example, on sites where civil engineering work is being performed, for the purpose of driving piles (stakes or sheet piles) by percussion, and into a very wide variety of types of ground.

BACKGROUND OF THE INVENTION

Electromagnetic hammers having ferromagnetic masses of conventional type, e.g. as described in document JP-A-56 153018, comprise a tube carrying a coil and, in the vicinity of one of its ends, an anvil. A mass of ferromagnetic material is slidably received inside the tube.

The coil is generally made by winding a copper cable onto an associated former. After the coil has been wound, the former together with its coil is fixed on the tube.

In use, the substantially vertical or inclined tube rests via its anvil on the element to be hammered. The coil is then excited by electrical power supply means, thereby generating an electromagnetic field that raises the mass. Thereafter, excitation of the coil is interrupted and the mass, under the action of its own weight, strikes the anvil which transmits the shock to the element that is to be hammered.

However, it has been found that while the mass is being raised, the coil which is not closely and rigidly supported is itself subjected to a reaction force that tends to compact it. In use, these successive deformations of the coil reduce the performance of the electromagnetic hammer and can lead to the coil being damaged.

Another problem encountered is that since the mass is very heavy and needs to strike the anvil on several occasions in order to drive home the element concerned, the electrical power supply means need to deliver a very high instantaneous level of power repetitively and for a very short duration. Unfortunately, when such means are connected to an electrical power supply mains, the large current peaks drawn suddenly and repeatedly from the mains give rise to voltage drops that are repeated at short intervals, giving rise to a "flicker" effect. The user then has to take out a subscription corresponding to the maximum level of power consumption, even though this level can be several times the mean level of power consumption. When the power supply means comprise an independent generator, then the current peaks drawn from the generator give rise to variations in the speed of the engine of the generator. This gives rise to significant wear on the engine and to an abnormal amount of exhaust fumes being produced.

Documents FR-A-2 015 204 and FR-A-2 581 100 illustrate electromagnetic hammers of the above-described type, in which the means for delivering electrical power to the coil comprise a battery of capacitors. The capacitors accumulate energy in electrostatic form and release it in a very short length of time. The capacitors suffer from the drawback of being expensive and of having a lifetime that is relatively short because of the high rate at which they are charged and discharged. The electrical circuit is also generally complicated.

In certain uses, it is necessary for the electromagnetic hammer to deliver shocks of lower energy and at a high frequency. Unfortunately, the capacitors behave like short circuits at the beginning of charging so they must be associated with a current limiting choke and a resistor so as to limit the current drawn from the mains. In addition, the capacitors and the coil form an oscillating circuit whose resonant frequency determines the maximum frequency of the blows. To obtain a higher frequency, it is necessary to reduce the number of capacitors. That kind of operation is not suitable for being performed on a worksite. In addition, the power of the blows and their frequency are varied by varying the voltage to which the capacitors are charged. Such variation can sometimes be difficult due to the complexity of the circuit.

SUMMARY OF THE INVENTION

An object of the invention is to propose an electromagnetic hammer whose structure enables it to generate high power shocks over a wide range of frequencies, and that provides high performance.

To achieve this object, the invention provides an electromagnetic hammer having a ferromagnetic moving mass, the hammer comprising both a tube designed to rest via an anvil against an element to be hammered, carrying a peripheral coil, and slidably receiving the mass inside itself, and electrical power supply means connected to the coil to excite it so as to generate an electromagnetic field for raising the mass, the mass striking the anvil under the action of its own weight when the coil is no longer excited, in which hammer the coil is made by being wound around the tube, the tube being made of a non-magnetic material and having means for taking up axial forces and for transmitting said forces to the anvil while the mass is being raised.

Thus, the coil is rigidly and closely supported by the tube so that it is subjected to substantially no deformation by the reaction force due to raising the mass. The performance of the hammer is thus not subjected to limitation and remains constant. The coil also presents a long lifetime. Furthermore, the reaction force to lifting is transmitted to the anvil and to the element to be hammered via the means for taking up and transmitting axial forces, such that said reaction force is used for the purpose of driving the element. The element is thus driven not only when the mass falls, but also while it is being raised. As a result the electromagnetic hammer presents a high degree of effectiveness and high efficiency.

In an advantageous embodiment of the invention, the means for taking up axial forces and for transmitting said forces comprise first and second reinforcing rings between which the coil is wound around the tube.

Thus, the reinforcing rings perform two functions. Firstly they make it easier to wind the coil around the tube by forming two cheek plates for the coil, and secondly they serve to take up and transmit to the tube a portion of the reaction force to which the coil is subjected while the moving mass is being raised.

Advantageously, in this embodiment, the means for taking up axial forces and for transmitting said forces further comprise two end rings each located in the vicinity of a respective end of the tube, and reinforcing spacers extending parallel to the longitudinal axis of the tube between each of said reinforcing rings and the adjacent end ring.

The reinforcing spacers serve to take up and transmit axial forces, thereby further reinforcing the tube.

According to another particular characteristic, the tube is covered by a soundproofing cowling extending over the entire length of said tube and preferably beyond its bottom end in such a manner as to cover the anvil and a top portion of the element to be hammered.

In which case, advantageously, the tube has air exhaust orifices in the vicinity of its bottom end, and the cowling has air exhaust orifices close to its top end so as to direct the air that escapes from the tube over the coil while the mass is moving downwards, thereby cooling said coil, an empty gap existing between the coil and the cowling.

Thus, the air displaced by the movements of the mass escapes via the orifices in the tube and is channeled by the cowling to the orifices formed at the top end. The air is thus forced over the coil so that heat is exchanged between the air moved in this way and the coil, thereby providing effective cooling for the coil.

Preferably, the cowling has guide elements at its bottom end for guiding the element to be hammered.

This makes the element easier to drive, and guarantees that the tube is supported by the element to be hammered.

In which case, preferably, the guide elements have respective top ends provided with damping pads associated with the anvil.

Thus, if the element to be hammered has penetrated into the ground too easily under the effect of the mass falling, the blow on the anvil is damped. This can happen, for example, in loose soil.

Also advantageously, the cowling has a top end presenting a central opening enabling the mass to be inserted into the tube or to be withdrawn therefrom.

The electromagnetic hammer of the invention can thus be handled and displaced part by part, thereby facilitating handling operations considerably.

In an advantageous embodiment of the power supply means of the hammer of the invention, the power supply means comprise an alternator having a rotor coupled to an flywheel and to a rotary motor for transforming a portion of the energy stored in mechanical form by the flywheel into electrical energy, and a power supply circuit connecting the alternator to the coil.

Thus, the necessary energy storage is performed in a manner that is very simple and reliable. Current peaks drawn from the alternator have little effect on rotation of the flywheel, such that the rate at which the rotary motor operates is hardly disturbed. In addition, a large quantity of energy can be stored at low cost, thereby making it possible to obtain blows of high power.

In a preferred embodiment, the power supply circuit comprises a rectifier bridge connected to the alternator, first and second conductors connecting the positive and negative terminals respectively of the rectifier bridge to the coil, a first switch member disposed on one of said conductors and actuatable between a conductive state in which the coil is powered and a non-conductive state in which the supply of power to the coil is interrupted, and a freewheel diode whose cathode is connected to the first conductor and whose anode is connected to the second conductor.

The power supply circuit is thus simple to implement. The power of the blows and their frequency can be varied simply by varying the length of time during which the coil is powered by actuating the first switch member. The power supply voltage remains constant. The freewheel diode makes it possible, when the first switch member is in the non-conductive state, to pass the energy stored in the coil during the period of conduction of the first switch member through the circuit. This energy can then be used for finishing off the raising of the mass inside the tube.

Advantageously, in this embodiment, the power supply circuit also comprises means for limiting the current induced in the coil while the mass is moving downwards, said current-limiting means comprising a diode and a resistor connected in series, and connected between the first and second conductors in parallel with the coil between the freewheel diode and the coil. These current limiting means serve to dissipate in the resistor the energy that is generated in the coil by the mass moving downwards. This avoids unfavorable braking of said mass.

Under such circumstances, and preferably, the said diode is connected to the second conductor between the coil and the freewheel diode, and the cathode of said diode is connected to one terminal of the resistor, the other terminal of the resistor being connected to the first conductor, a second switch member also being provided that can be actuated between a conductive state and a non-conductive state, said second switch member being interposed in the second conductor between the freewheel diode and said diode coupled to the resistor.

In another possible variant embodiment, an additional coil is made by being wound around the tube in an axial position situated between the coil and the anvil, said additional coil being connected to the coil to be powered by the current induced therein while the mass is moving downward.

In this way, the energy generated in the coil by the mass moving downwards is made use of to excite the additional coil. As a result, firstly braking of the mass by the coil is avoided, and secondly the additional coil generates a magnetic field for accelerating the downward motion of the mass. The effectiveness of the electromagnetic hammer is thus further improved.

BRIEF DESCRIPTION OF THE DRAWINGS

Other characteristics and advantages of the invention will appear on reading the following description of particular and non-limiting embodiments of the invention.

Reference is made to the accompanying drawings, in which:

FIG. 4 is a diagram associated with the control pulses for the transistors;

FIG. 5 is a circuit diagram of a second version of the power supply circuit, the switching members used being thyristors;

FIG. 6 is a diagram associated with the control pulses for the thyristors;

DESCRIPTIONS OF THE PREFERRED EMBODIMENT

Figure 1:
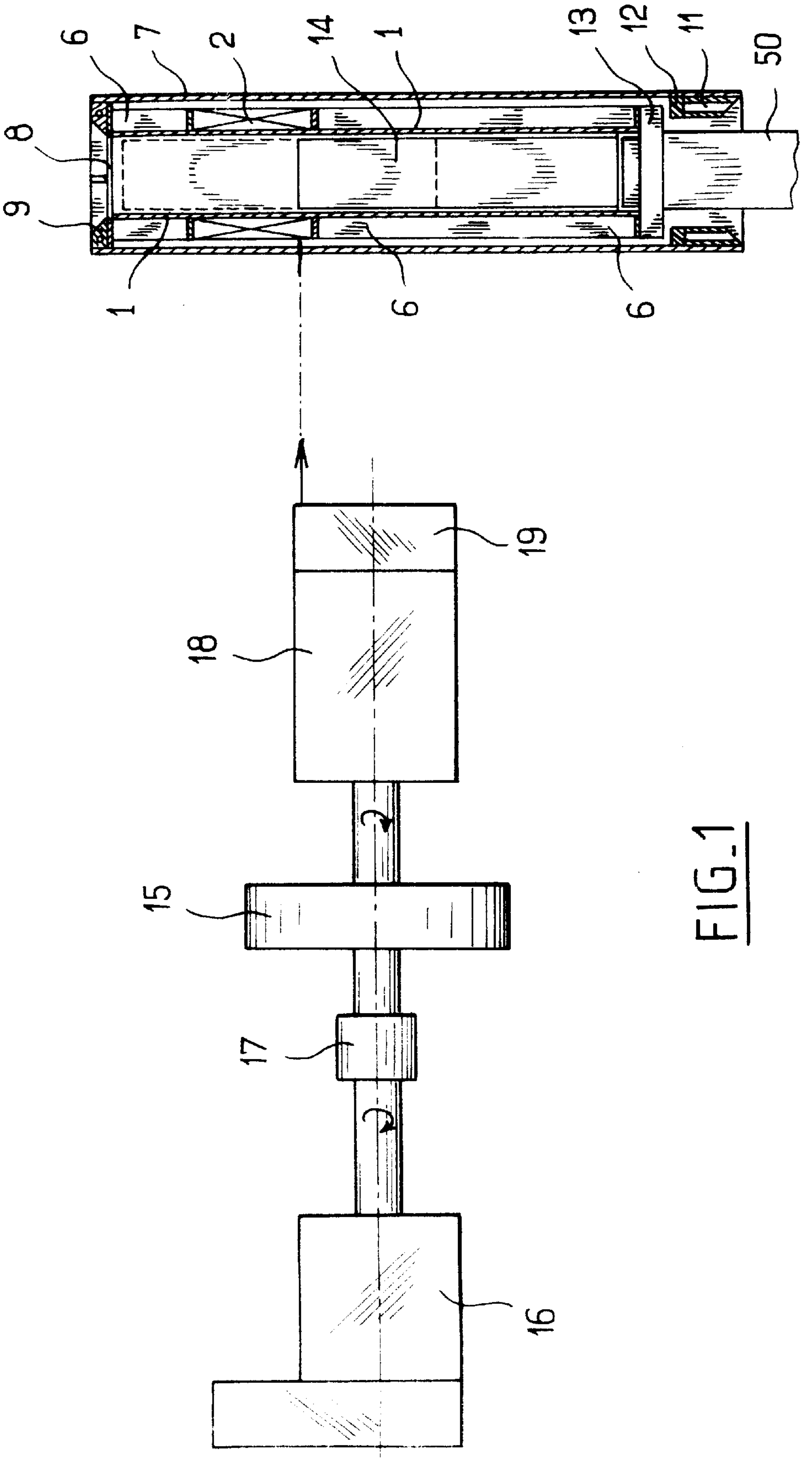
FIG. 1 is a diagrammatic view of the power supply means of the electromagnetic hammer of the invention.
Figure 2:
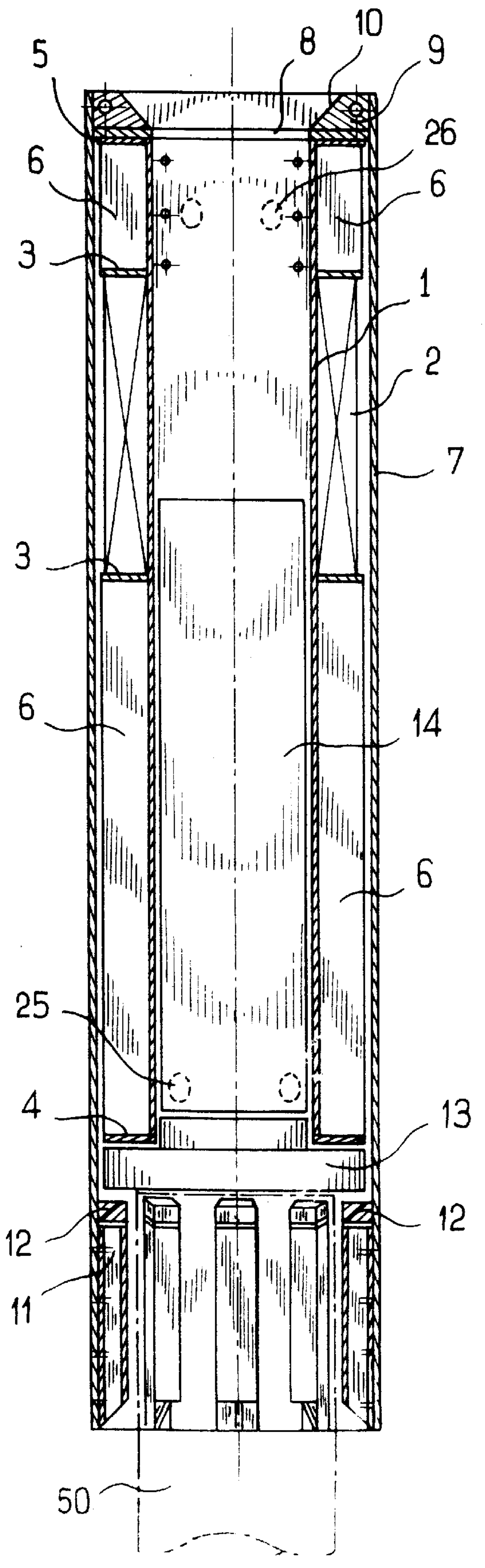
FIG. 2 is an axial section view through a first embodiment of the electromagnetic hammer, the electromagnetic hammer having only one peripheral coil and being shown in its in-use position, i.e. striking the anvil.

With references to FIGS. 1 and 2, the electromagnetic hammer constituting the first embodiment comprises a tube 1, in this case made of non-magnetic stainless steel, and carrying a peripheral coil 2. The coil is made by winding a strip of aluminum directly around the tube 1 so as to limit the mass of the electromagnetic hammer. It would naturally be possible to use a copper coil. The coil is preferably embedded in an insulating resin, thus helping keep it in a compact block, and its ends are disposed against two reinforcing rings 3 welded to the tube 1. Another ring 4 is welded to the bottom end of the tube 1, and a final ring 5 is welded to the top end of said tube. The rings 4 and 5 constitute end rings. In addition, lateral reinforcement 6 is provided in the form of reinforcing spacers extending axially along the tube between the first ring 3 and the ring 4, and between the second ring 3 and the ring 5. The reinforcing rings, the end rings, and the lateral reinforcements form means for taking up and transmitting axial forces.

In this case, the top ring 5 also constitutes a ring for bearing against a soundproofing cowling 7. The cowling 7 may merely bear against the ring 5 or it can be welded or bolted thereto. The cowling 7 is made of steel or of rigid plastics material and it possesses an inside wall chat is advantageously covered in a soundproofing coating. The cowling 7 covers the tube 1 together with the above-described rings, the lateral reinforcements, and the coil 2, and it preferably extends beyond the bottom end of the tube 1. An empty gap remains between the cowling 7 and the coil 2. The advantage of this empty gap is explained below. It should be observed that the cowling 7 has a top end with a circular opening 8 of diameter equal to the inside diameter of the tube 1, and carrying fastener elements 9 extending radially around the opening 8 and presenting respective chamfered edges 10 adjacent to the opening 8.

The bottom portion of the cowling 7 carries guide elements 11 formed in this case by H section iron bars each having one flange bolted or welded to the inside face of the cowling 7. Each guide element 11 has a top end carrying a resilient pad 12 against which an anvil 13 rests in the absence of any element to be hammered, the anvil 13 being placed between the resilient pads and the bottom end of the tube 1. The resilient pads 12 serve to damp the anvil 13 when hammering empty.

A ferromagnetic mass 14 of steel, and of cylindrical shape, is slidably received inside the tube 1, constituting a moving core for the coil 2.

Close to its bottom end, the tube 1 has exhaust orifices 25 and the cowling 7 has exhaust orifices 26 close to its top end. A flow of air between the cowling 7 and the tube 1 can thus be established for the purpose of cooling the coil.

The electromagnetic hammer also comprises electrical power supply means which are described below with reference to FIGS. 1, 3, and 4.

With reference to FIG. 1, and in accordance with another characteristic of the invention, the power supply means comprise an flywheel 15 mounted on the rotor shaft of an alternator 18. The rotor of the alternator 18 is also coupled to the shaft of a rotary motor 16 via a resilient coupling 17 placed between the flywheel 15 and the rotary motor 16. The alternator 18 has an electronic regulation system 19 to deliver standard three-phase AC. The flywheel 15 must be of dimensions such that the kinetic energy that is accumulated therein is about ten times greater than the electrical energy consumed by the coil 2 when powered by the alternator 18. The rotary motor 16 can be an electric motor connected to the electrical power supply mains, or a hydraulic motor, or indeed an engine running on gasoline, gas oil, etc.

Figure 3:
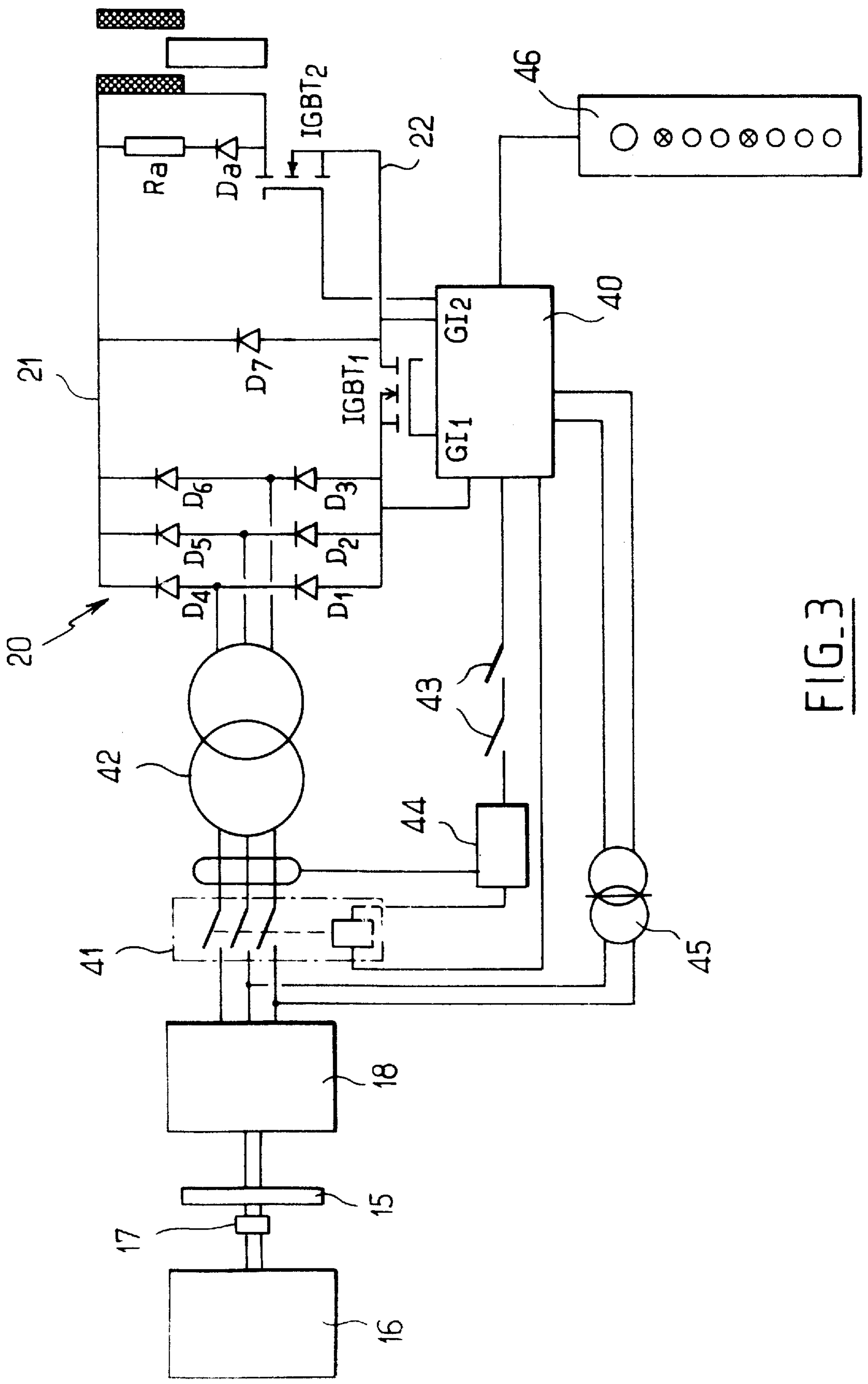
FIG. 3 is an overall circuit diagram of the above embodiment of an electromagnetic hammer showing a first version of the power supply circuit, the switching members used being insulated gate bipolar transistors (IGBTs)

The alternator 18 is connected to the coil 2 via a power supply circuit, a first version of which is shown in FIG. 3.

With reference to FIG. 3, the power supply circuit comprises a rectifier bridge 20 connected via a contactor 41 and a transformer 42 to the alternator 18 and made up in conventional manner of six diodes referenced D1 to D6. The rectifier bridge 20 thus delivers DC. The positive terminal of the rectifier bridge is connected to one terminal of the coil 2 by a conductor 21.

The negative terminal of the rectifier bridge 20 is connected in series with the emitter of a power transistor IGBT1 that constitutes a first switch member. The collector of the transistor IGBT1 is connected firstly to the anode of a freewheel diode D7 whose cathode is connected to the conductor 21, and secondly by means of a second conductor 22 to the emitter of a power transistor IGBT2 forming a second switch member. The collector of the transistor IGBT2 is connected firstly to the other terminal of the coil 2 and secondly to the anode of a diode D8 whose cathode is connected to the conductor 21 via a resistor Ra. It can be seen that the diode D8 and the resistor Ra are connected in parallel with the coil 2. Naturally, the diode D8 and the resistor Ra could exchange positions. Furthermore, the resistor Ra can be constituted by linear elements, or advantageously by elements that are not linear, exhibiting resistance that decreases with increasing voltage applied thereto. Another advantageous solution would be to connect linear and non-linear elements in series.

The transistors IGBT1 and IGBT2 are controlled to take up a conductive state or a non-conductive state by an electronic control circuit 40, which in this case comprises respective pulse generators GI1 and GI2. These generators deliver squarewave voltage pulses as shown in FIG. 4.

The electronic control circuit 40 is also connected to the contactor 41 via safety switches 43 and a ground fault detector 44. The electronic control circuit 40 is powered by the alternator 18 via an isolating transformer 45. The electronic control circuit 40 is also connected to a display and control apparatus 46 for informing the user of the state of the safety members and for enabling the user to control the operation of the hammer.

It will be observed that using a transformer 42 is advantageous since it makes it possible to increase voltage and thus to decrease current in the power supply circuit. The section of the conductors can therefore be decreased and switching elements of small dimensions can therefore be used.

With reference to FIGS. 1, 2, 3, and 4, in operation, the tube 1 is lifted by a crane whose hooks co-operate with the fastening elements 9 of the cowling 7 so that it occupies a position vertically above the element to be hammered 50, with the anvil 13 resting on said element to be hammered. Although the tube is shown herein as being in a vertical position, it can also be used in an inclined position.

Using the crane, the mass 14 is inserted through the opening 8 of the cowling 7 (where such insertion is made easier by the guidance provided by the chamfered edges 10 of the fastening elements 9).

The element to be hammered 50 is constituted in this case by a stake guided inside the cowling 7 by the guide elements 11. If the stake 50 is of a diameter smaller than the diameter of the opening defined by the guide elements 11, it is advantageous to provide a removable tubular matching sleeve secured to the bottom end of the cowling 7. In a variant, if the element to be hammered is a sheet pile, provision can be made for the bottom portion of the cowling to have symmetrical and removable elements so as to leave slots through which a sheet member can pass.

The electrical power supply means are connected to the coil 2 in conventional manner by means of a sheathed cable. Connection of the cable to the coil is performed in leakproof manner by means that are not shown herein.

The rotary motor 16 is put into operation at a desired rate. It thus drives the flywheel 15 and the rotor of the alternator 18. The alternator 18 is then capable of delivering three-phase AC.

If allowed to do so by the safety members 43 and 44, the operator puts the hammer into operation by acting on the display and control apparatus 46.

To raise the mass 14 (time to), the pulse generators GI1 and GI2 cause both transistors IGBT1 and IGBT2 to take up a conductive state. The coil 2 is then excited by the passage of DC coming from the alternator 18 via the rectifier bridge 20.

While current is being drawn in this way, the speed of the rotary members decreases. However, this reduction in speed is small given the large quantity of kinetic energy stored in the flywheel 15 compared with the quantity of energy being delivered by the alternator 18. The rotary motor 16 therefore has little difficulty in returning quickly to its initial speed of rotation.

Excitation of the coil 2 generates a magnetic field which in turn generates a Lorentz force capable of raising the mass 14. In addition, during said excitation, a force in reaction to the lifting is exerted on the coil 2 urging it towards the mass so that the tube 1 is pressed hard, via the rings 3 and 4 and the lateral reinforcements 6, against the anvil 13 resting on the element to be hammered. The reaction force during lifting is of the order of four to five times the weight of the mass and it is thus transmitted directly to the element to be hammered 50 without damaging the coil 2 or the tube 1. The reaction force is thus used for driving the element 50. As a result a phenomenon is obtained that is similar to the "diesel" effect used by diesel hammers.

It will be observed that unlike diesel hammers, the electromagnetic hammer of the invention can be used with the same effectiveness to drive elements into loose ground, since the above-mentioned phenomenon occurs independently of the nature of the ground.

Once the mass 14 has been raised to a predetermined height, the transistor IGBT1 is switched to its non-conductive state by the pulse generator GI1 (time t1). The energy stored in the coil 2 during the period the transistor IGBT1 was conducting creates a current which flows via the transistor IGBT2 and the freewheel diode D7, looping back to the coil 2. Since the coil 2 continues to be excited by this current, the lifting force continues to raise the mass 14. Once the total desired lift height has been reached, the transistor IGBT2 is switched to its non-conducting state by the pulse generator GI2 (time t2). The coil 2 is no longer excited and the mass 14 begins to drop freely under drive from its own weight.

As the mass 14 moves down through the coil 2 it generates an induced current therein, thereby creating a magnetic field which brakes the mass 14. This induced current passes through the diode D8 and the resistor Ra which constitutes means for limiting the induced current by dissipating the energy generated in the coil by the mass 14 moving downwards. This limits the braking effect thereon. The mass 14 then strikes the anvil 13 with maximum force and in turn the anvil transmits the shock to the stake 50 that is to be hammered.

It will be understood that the movements of the mass 14 inside the tube 1 cause air to be displaced. The air displaced in this way passes through the orifices 25 formed in the tube 1 and the orifices 26 formed in the cowling 7 after being channeled and directed by the cowling towards the coil 2. This serves to cool the coil, particularly on each occasion that the mass 14 moves down inside the tube.

In addition, to vary the power of the blows and their frequency, it suffices to modify the height through which the mass 14 is raised. For this purpose, it is necessary to act in conventional manner on the pulse generators GI1 and GI2 so as to modify the durations during which the transistors IGBT1 and IGBT2 are simultaneously respectively in the conducting state and in the non-conducting state.

A second version of the power supply circuit is described below with reference to FIGS. 5 and 6.

Elements identical or analogous to those described above are given the same numerical references in the description below.

As in the first version, the second version of the power supply circuit has a rectifier bridge 20 connected to the coil 2, a freewheel diode D7, a diode D8, and a resistor Ra.

In this version, the rectifier bridge 20 comprises both diodes D1, D2, D3, and thyristors Th1, Th2, Th3. The gates of the thyristors Th1, Th2, and Th3 are connected in parallel to a pulse generator GI1. The thyristors Th1, Th2, and Th3 constitute a first switch member, and they are controlled by the pulse generator GI1 to switch between a conductive state in which the coil 2 is powered and a non-conductive state in which the supply of power to the coil is interrupted.

The negative terminal of the rectifier bridge 20 is connected to the cathode of a thyristor Th4 whose anode is connected to the terminal of the coil 2 which is connected to the anode of the diode D8. The gate of the thyristor Th4 is connected to a pulse generator GI2 and forms a second switch member that is controllable between a conductive state and a non-conductive state.

The power supply circuit also comprises a conventional circuit for extinguishing the thyristor Th4.

This extinction circuit is constituted by a diode D9, a resistor RC, a resistor RL, and a thyristor Th5 connected in series, the anode of the diode D9 being connected to the conductor 21 and the cathode of the thyristor Th5 being connected to the cathode of the thyristor Th4. The gate of the transistor Th5 is connected to a pulse generator GI3. A capacitor Cex is also connected to the anode of the thyristor Th4 and to the terminal of the resistor RC which is connected to the resistor RL.

The pulse generators GI1, GI2, and GI3 control the thyristors to whose gates they are connected by means of squarewave voltage pulses of the kind shown in FIG. 6.

In operation, at time t0, the thyristors Th1, Th2, Th3, and Th4 are put into the conductive state by the pulse generators GI1 and GI2. The coil 2 is then excited, and the capacitor Cex is charged via the diode D9 and the resistor RC.

At time t1, the thyristors Th1, Th2, and Th3 are switched to their non-conductive state so the current created in the coil 2 is directed via the freewheel diode D7 so as to return to the coil. The capacitor Cex remains charged because of the diode D9.

At time t2, the thyristor Th5 is put into its 35 conductive state by the pulse generator GI3 so that the capacitor Cex discharges through the resistor RL and the thyristor Th5. The anode of the thyristor Th4 is then at a potential which is negative relative to its cathode so the thyristor Th4 ceases to conduct. The current induced in the coil is then conveyed via the resistor Ra.

Figure 7:
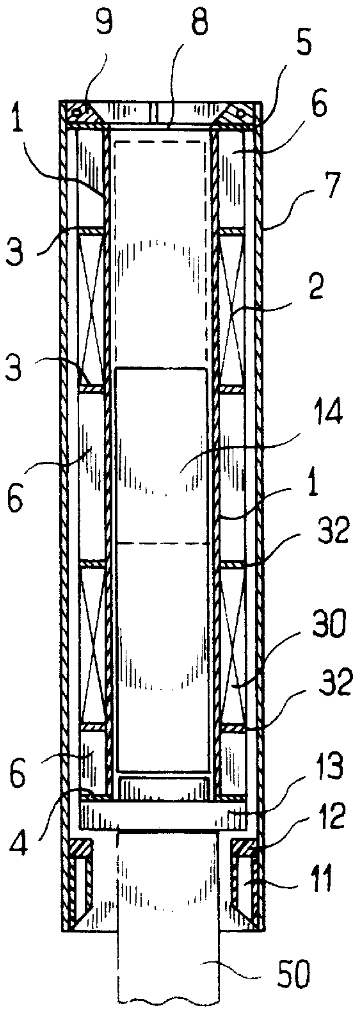
FIG. 7 is a simplified axial section view through an electromagnetic hammer constituting a second embodiment, the hammer having an additional second coil.

A second embodiment of the electromagnetic hammer is described below with reference to FIG. 7.

As before, the electromagnetic hammer comprises a tube 1 having rings 3, 4, and 5 welded thereto together with lateral reinforcements 6, and a peripheral coil 2 is formed around the tube 1. As before, the tube 1 is covered by an insulating cowling 7 whose top portion has an opening 8 and fastening elements 9, and whose inside carries, at its bottom end, guide elements 11 and resilient pads 12. An anvil 13 is received between the bottom end of the tube 1 and the resilient pads 12. A mass 14 is slidably received inside the tube 1.

An additional peripheral coil 30 is wound directly about the tube 1 between the coil 2 and the bottom end of the tube 1, in a manner analogous to the coil 2.

The additional coil 30 lies between two reinforcing rings 32 in a manner analogous to the coil 2. As before, end rings 4 and 5 are located close to the ends of the tube 1. Lateral reinforcements 6 extend parallel to the longitudinal axis of the tube 1 between the reinforcing rings 3, 32 and the adjacent end rings 4, 5, and also between the mutually adjacent reinforcing rings 3 and 32.

The power supply means for this second embodiment of the electromagnetic hammer comprise, as before, a rotary motor, an flywheel, and an alternator connected to the coil 2 via a power supply circuit.

Figure 8:
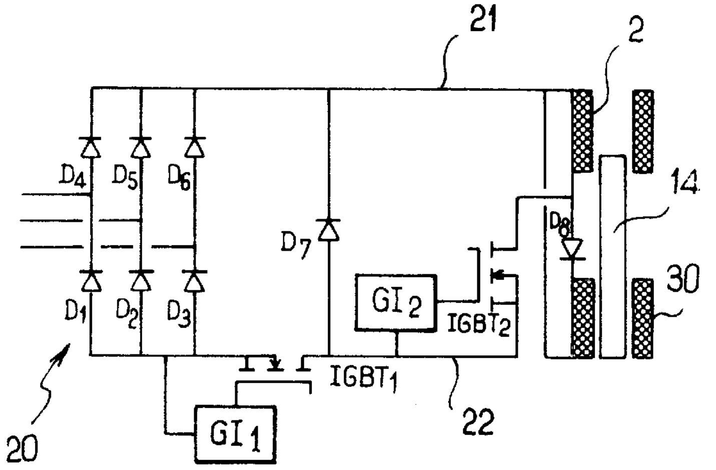
FIG. 8 is a circuit diagram of a first version of the power supply circuit for the second embodiment of the electromagnetic hammer.

A first version of the associated power supply circuit is shown in FIG. 8.

In manner analogous to the power supply circuit of FIG. 3 as described above, a rectifier bridge 20 made up of diodes D1 to D6 and connected to the coil 2, a first power transistor IGBT1, a freewheel diode D7, and a second power transistor IGBT2. The transistors IGBT1 and IGBT2 are controlled by respective pulse generators GI1 and GI2 in the same manner as for the FIG. 3 circuit.

The terminal of the coil 2 that is connected to the transistor IGBT2 is also connected to a terminal of the additional coil 30 via a diode D8. The other terminal of the additional coil 30 is connected to the conductor 21 between the freewheel diode D7 and the coil 2.

At time t2 when the transistor IGBT2 is switched into its non-conductive state, the current induced in the coil 2 by the mass 14 moving downwards flows through the additional coil 2 and excites it. This generates a magnetic field giving rise to a Lorentz force which drives the mass 14 downwards. This limits the current induced in the coil 2 while also accelerating the mass 14.

Figure 9:
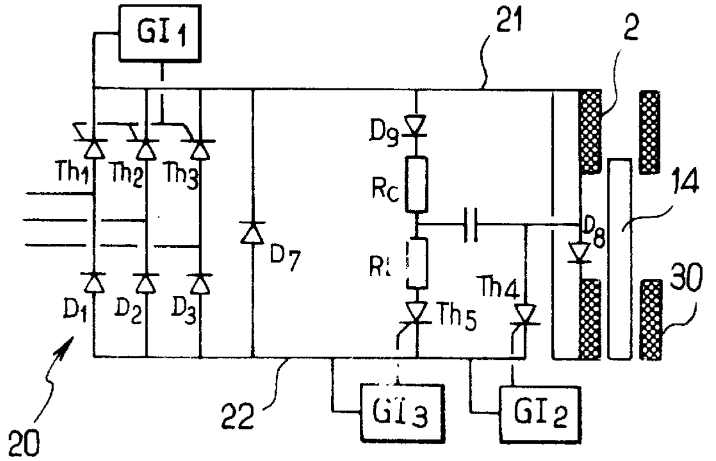
FIG. 9 is a circuit diagram of a second version of said power supply circuit.

A variant of this power supply circuit is shown in FIG. 9.

The modified power supply circuit comprises, in manner similar to the power supply circuits of FIG. 5 as described above, a rectifier bridge 20 made up of diodes D1, D2, D3, and of thyristors Th1, Th2, Th3 forming a first switch member connected to the coil 2, a freewheel diode D7, a diode D9, a resistor RC, a resistor RL, a thyristor Th5, a capacitor Cex, and a thyristor Th4. The thyristors Th1, Th2, Th3, Th4, and Th5 are controlled by pulse generators GI1, GI2, and GI3 in identical manner to the circuit of FIG. 5.

The terminal of the coil 2 which is connected to the thyristor Th4 is also connected to one of the terminals of the additional coil 30 via a diode D8. The other terminal of the additional coil 30 is connected to the conductor 21.

Operation is identical to that described above for the first version of this power supply circuit as shown in FIG. 8.

Naturally, the invention is not limited to the embodiments described and variants can be applied thereto without going beyond the ambit of the invention as defined by the claims.

In particular, although the power supply circuit is shown as using IGBT power transistors or thyristors, any other appropriate switching member could be used.

Although the use of the thyristor Th4 is shown with reference to an extinction circuit, the thyristor Th4 could be a self-extinguishing thyristor, in which case there would be no point in having an extinction circuit.

Finally, although the electromagnetic hammers are shown only as having a bottom anvil, they can also be fitted with top anvils for the purpose of extracting elements that have been driven into the ground.

What is claimed is:

1. An electromagnetic hammer having a ferromagnetic moving mass, the hammer comprising both a tube (1) designed to rest via an anvil against an element to be hammered (50), carrying a peripheral coil (2), and slidably receiving the mass (14) inside itself, and electrical power supply means connected to the coil (2) to excite it so as to generate an electromagnetic field for raising the mass, the mass striking the anvil under the action of its own weight when the coil is no longer excited, wherein the coil (2) is made by being wound around the tube (1), the tube being made of a non-magnetic material and having means (3, 4, 5, 6) for taking up axial forces and for transmitting said forces to the anvil (13) while the mass (14) is being raised.

2. An electromagnetic hammer according to claim 1, wherein the means for taking up axial forces and for transmitting said forces comprise first and second reinforcing rings (3) between which the coil (2) is wound around the tube (1).

3. An electromagnetic hammer according to claim 2, wherein the means for taking up axial forces and for transmitting said forces further comprise two end rings (4, 5) each located in the vicinity of a respective end of the tube (1), and reinforcing spacers (6) extending parallel to the longitudinal axis of the tube between each of said reinforcing rings (3) and the adjacent end ring (4 or 5).

4. An electromagnetic hammer according to claim 1, wherein the tube (1) is covered by a soundproofing cowling (7) extending over the entire length of said tube and preferably beyond its bottom end in such a manner as to cover the anvil (13) and a top portion of the element to be hammered (50).

5. An electromagnetic hammer according to claim 4, wherein the tube (1) has air exhaust orifices (25) in the vicinity of its bottom end, and wherein the cowling (7) has air exhaust orifices (26) close to its top end so as to direct the air that escapes from the tube (1) over the coil (2) while the mass (14) is moving downwards, thereby cooling said coil, an empty gap existing between the coil (2) and the cowling (7).

6. An electromagnetic hammer according to claim 4 wherein the cowling (7) has guide elements (11) at its bottom end for guiding the element to be hammered (50).

7. An electromagnetic hammer according to claim 6, wherein the guide elements (11) have respective top ends provided with damping pads (12) associated with the anvil.

8. An electromagnetic hammer according to claim 4, wherein, characterized in that the cowling (7) has a top end presenting a central opening (8) enabling the mass (14) to be inserted into the tube (1) or to be withdrawn therefrom.

9. An electromagnetic hammer according to claim 1, wherein the power supply means comprise an alternator (18) having a rotor coupled to an flywheel (15) and to a rotary motor (16) for transforming a portion of the energy stored in mechanical form by the flywheel (15) into electrical energy, and a power supply circuit connecting the alternator (18) to the coil (2).

10. An electromagnetic hammer according to claim 9, wherein the power supply circuit comprises a rectifier bridge (20) connected to the alternator (18), first and second conductors (21, 22) connecting the positive and negative terminals respectively of the rectifier bridge (20) to the coil (2), a first switch merger (IGBT1; Th1, Th2, Th3) disposed on one of said conductors and actuatable between a conductive state in which the coil (2) is powered and a non-conductive state in which the supply of power to the coil (2) is interrupted, and a freewheel diode (D7) whose cathode is connected to the first conductor (2) and whose anode is connected to the second conductor (21).

11. An electromagnetic hammer according to claim 10, wherein the power supply circuit also comprises means for limiting the current induced in the coil (2) while the mass (14) is moving downwards, said current-limiting means comprising a diode (D8) and a resistor (Ra) connected in series, and connected between the first and second conductors (21, 22) in parallel with the coil (2) between the freewheel diode (D7) and the coil (2).

12. An electromagnetic hammer according to claim 11, wherein said diode (D8) is connected to the second conductor (22) between the coil (2) and the freewheel diode (D7), and the cathode of said diode (D8) is connected to one terminal of the resistor (Ra), the other terminal of the resistor being connected to the first conductor (21), a second switch member (IGBT2, Th4) also being provided that can be actuated between a conductive state and a non-conductive state, said second switch member being interposed in the second conductor (22) between the freewheel diode (D7) and said diode (D8) coupled to the resistor (Ra).

13. An electromagnetic hammer according to claim 1, wherein an additional coil (30) is made by winding around the tube (1) in an axial position situated between the coil (2) and the anvil (13), said additional coil being connected to the coil (2) to be powered by the current induced therein while the mass (14) is moving downward.

14. An electromagnetic hammer according to claim 13, wherein the means for taking up axial forces and for transmitting them while the mass (14) is being raised comprise third and fourth reinforcing rings (32) between which the additional coil (30) is wound, two end rings (4, 5) being placed each in the vicinity of a respective end of the tube (1) and reinforcing spacers (6) extending parallel to the longitudinal axis of the tube (1) between the first reinforcing ring (3) and the adjacent end ring (5), between the second and third reinforcing rings (3, 32), and between the fourth reinforcing ring (32) and the adjacent end ring (4).

* * * * *

UNITED STATES PATENT AND TRADEMARK OFFICE
CERTIFICATE OF CORRECTION

PATENT NO. : 6,201,362 B1
DATED : March 13, 2001
INVENTOR(S) : DeMichelis

It is certified that error appears in the above-identified patent and that said Letters Patent is hereby corrected as shown below:

Title page,
Item [73] Assignee: Entreprise de Travaux Publics et Prives Georges Durmeyer, Mittersheim (FR)

Signed and Sealed this

Eighth Day of January, 2002

*Attest:*

JAMES E. ROGAN
*Director of the United States Patent and Trademark Office*

*Attesting Officer*